(12) United States Patent
Lai et al.

(10) Patent No.: US 12,147,614 B2
(45) Date of Patent: Nov. 19, 2024

(54) SYSTEM AND METHOD FOR REMOTELY CONTROLLING EXTENDED REALITY BY VIRTUAL MOUSE

(71) Applicant: HTC Corporation, Taoyuan (TW)

(72) Inventors: Chao-Hsiang Lai, Taoyuan (TW);
Cheng-Han Hsieh, Taoyuan (TW);
Tzu-Yin Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/298,359

(22) Filed: Apr. 10, 2023

(65) Prior Publication Data

US 2024/0028137 A1  Jan. 25, 2024

Related U.S. Application Data

(60) Provisional application No. 63/391,322, filed on Jul. 22, 2022.

(51) Int. Cl.
| | |
|---|---|
| *G06F 3/0346* | (2013.01) |
| *G06F 3/00* | (2006.01) |
| *G06F 3/01* | (2006.01) |
| *G06F 3/0485* | (2022.01) |

(52) U.S. Cl.
CPC .......... *G06F 3/0346* (2013.01); *G06F 3/005* (2013.01); *G06F 3/014* (2013.01); *G06F 3/0485* (2013.01); *G06F 2203/0331* (2013.01)

(58) Field of Classification Search
None
See application file for complete search history.

(56) References Cited

U.S. PATENT DOCUMENTS

| | | | |
|---|---|---|---|
| 2017/0168566 A1* | 6/2017 | Osterhout | G02F 27/017 |
| 2020/0133395 A1* | 4/2020 | Kaneko | G06F 3/0346 |

* cited by examiner

*Primary Examiner* — Stephen T. Reed
(74) *Attorney, Agent, or Firm* — JCIPRNET

(57) ABSTRACT

A system and a method for remotely controlling extended reality by a virtual mouse are provided. The system includes a head mounted display and a first remote controller for being worn on a hand. The head mounted display includes an image capture device. The first remote controller communicatively connects to the head mounted display, wherein the head mounted display is configured to: capture an image through the image capture device; detect the image to obtain first data of the hand in the image and second data of a plane in the image; and enable the virtual mouse according to the first data and the second data.

20 Claims, 7 Drawing Sheets

SYSTEM AND METHOD FOR REMOTELY CONTROLLING EXTENDED REALITY BY VIRTUAL MOUSE

CROSS-REFERENCE TO RELATED APPLICATION

This application claims the priority benefit of U.S. provisional application Ser. No. 63/391,322, filed on Jul. 22, 2022. The entirety of the above-mentioned patent application is hereby incorporated by reference herein and made a part of this specification.

BACKGROUND

Technical Field

The disclosure relates to extended reality (XR) technology, and particularly related to a system and a method for remotely controlling extended reality by a virtual mouse.

Description of Related Art

Along with the improvement of technology, head mount displays (HMD) with XR function become more and more popular. An HMD may create an XR environment for a user such that the user may interact with virtual objects shown in the XR scene provided by the XR environment. The user of the HMD may perform a hand gesture to interact with the XR environment. However, interacting with the XR environment by the hand gesture may cause a lot of problems, for example, the HMD may receive unexpected input cause by occlusion issues. In addition, performing hand gesture may fatigue the user. On the other hand, the user of the HMD may interact with the XR environment by using a remote controller. However, interacting with the XR environment by the remote controller is inconvenient for the user. For example, the user has to establish the mapping relationship between the bottom of the remote controller and the XR function. Furthermore, since the user using the remote controller cannot be hand free, the remote controller is not suitable for the augmented reality (AR) system.

SUMMARY

The disclosure is directed to a system and a method for remotely controlling extended reality by a virtual mouse.

The present invention is directed to a system for remotely controlling extended reality by a virtual mouse, wherein the system includes a head mounted display and a first remote controller for being worn on a hand. The head mounted display includes an image capture device. The first remote controller communicatively connects to the head mounted display, wherein the head mounted display is configured to: capture an image through the image capture device; detect the image to obtain first data of the hand in the image and second data of a plane in the image; and enable the virtual mouse according to the first data and the second data.

The present invention is directed to a method for remotely controlling extended reality by a virtual mouse, suitable for a system including a head mounted display and a first remote controller for being worn on a hand, wherein the method including: capturing an image by the head mounted display; detecting the image to obtain first data of the hand in the image and second data of a plane in the image by the head mounted display; and enabling the virtual mouse according to the first data and the second data by the head mounted display.

Based on the above description, the present invention provides a convenient and intuitive way for the user of an HMD to interact with the XR environment.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
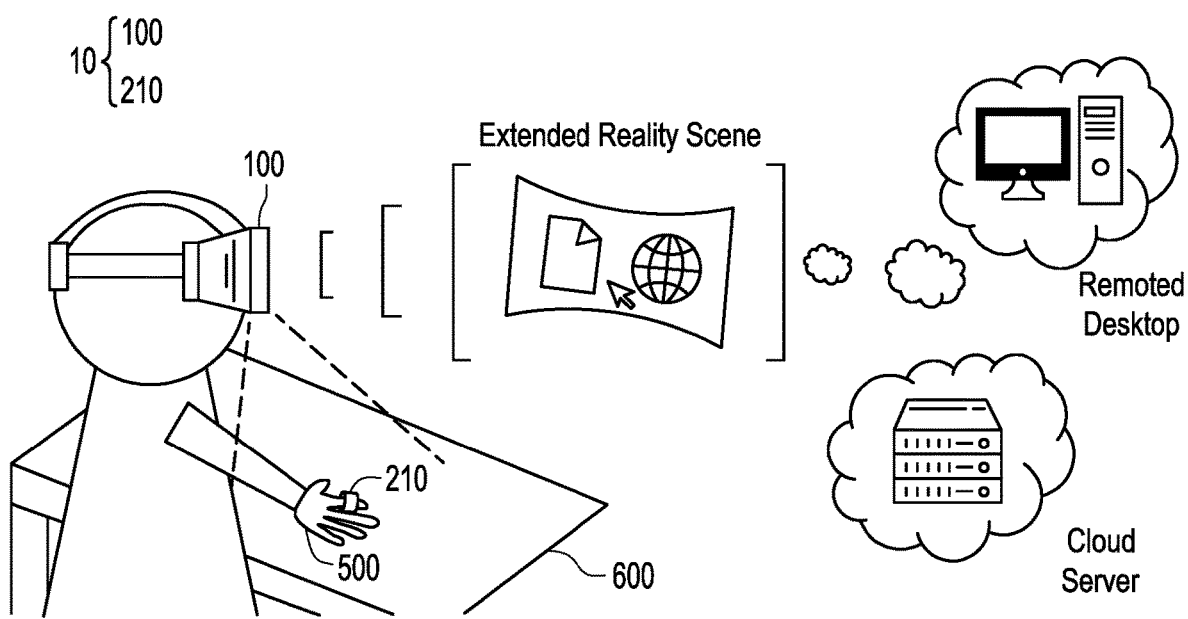
FIG. 1 illustrates a schematic diagram of a usage scenario of a system for remotely controlling extended reality by a virtual mouse according to one embodiment of the present invention.

FIG. 1 illustrates a schematic diagram of a usage scenario of a system 10 for remotely controlling extended reality by a virtual mouse according to one embodiment of the present invention, wherein the system 10 may include an HMD 100 worn on a user's head and a remote controller 210 worn on by the user's hand 500. The HMD 100 may be used for providing a XR environment (or XR scene) such as a virtual reality (VR) environment, an AR environment, or a mixed reality (MR) environment for the user.

After the HMD 100 detecting a specific gesture performed by the hand 500 on a plane (e.g., a desktop) 600, the HMD 100 may switch a control mode of the HMD 100 (or the control mode of the XR scene) from another control mode (e.g., a keyboard mode) to a mouse mode. When the HMD 100 is in the mouse mode, a virtual mouse simulated by the hand 500 wearing the remote controller 210 may be enabled.

The user may interact with the XR scene provided by the HMD 100 by using the virtual mouse so as to update the XR scene. The updating of the XR scene may relate to an updating of a remoted desktop or a data transmission between the HMD 100 and a cloud server.

Figure 2:
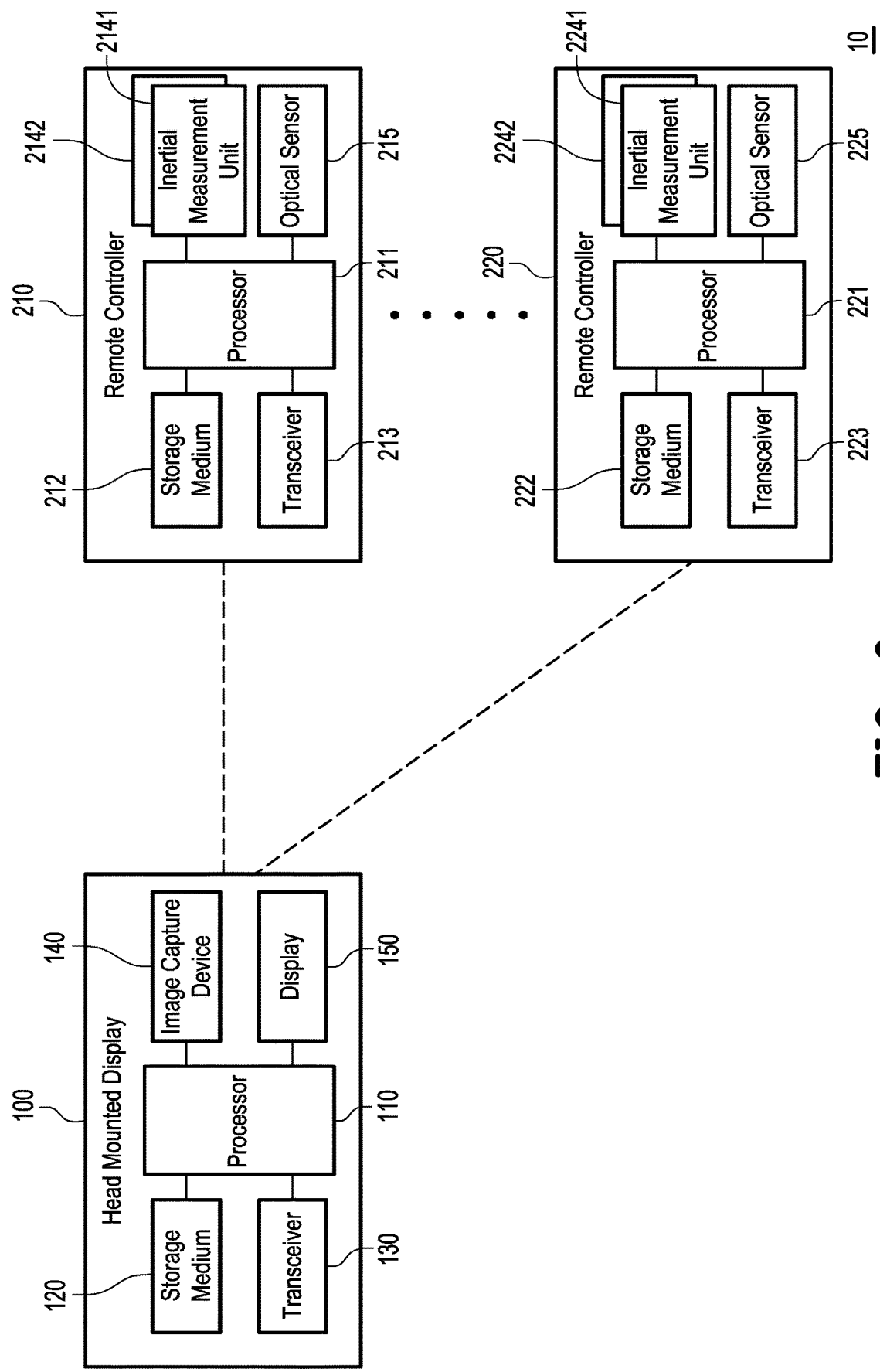
FIG. 2 illustrates a schematic diagram of the system according to the one embodiment of the present invention.

FIG. 2 illustrates a schematic diagram of the system 10 according to the one embodiment of the present invention. The system 100 may include the HMD 100 and one or more remote controllers communicatively connecting to the HMD 100. It is assumed that the one or more remote controllers include a remote controller 210 and a remote controller 220. However, the number of the one or more controller is not limited thereto.

The HDM 100 may include a processor 110, a storage medium 120, a transceiver 130, an image capture device 140, and a display 150. The processor 110 may be, for example, a central processing unit (CPU), or other programmable general purpose or special purpose micro control unit (MCU), a microprocessor, a digital signal processor (DSP), a programmable controller, an application specific integrated circuit (ASIC), a graphics unit (GPU), an arithmetic logic unit (ALU), a complex programmable logic device (CPLD), a field programmable gate array (FPGA), or other similar device or a combination of the above devices. The processor 110 may be coupled to the storage medium 120, the transceiver 130, the image capture device 140, and the display 150.

The storage medium 120 may be, for example, any type of fixed or removable random access memory (RAM), a read-only memory (ROM), a flash memory, a hard disk drive (HDD), a solid state drive (SSD) or similar element, or a combination thereof. The storage medium 120 may be a non-transitory computer readable storage medium configured to record a plurality of executable computer programs, modules, or applications to be loaded by the processor 110 to perform the function of the HMD 100.

The transceiver 130 may be configured to transmit or receive wired/wireless signals. The transceiver 130 may also perform operations such as low noise amplifying, impedance matching, frequency mixing, up or down frequency conversion, filtering, amplifying, and so forth. The processor 110 may communicate with other devices (e.g., remote controller, cloud server, or remote desktop) via the transceiver 130.

The image capture device 140 may be, for example, a camera or a photographic device for capturing images. The image capture device 140 may include a complementary metal oxide semiconductor (CMOS) sensor or a charge-coupled device (CCD) sensor.

The display 150 may be used for displaying video data or image data such as an XR scene of the XR environment for the user wearing the HMD 100. the display 150 may include a liquid-crystal display (LCD) or an organic light-emitting diode (OLED) display. In one embodiment, the display 150 may provide an image beam to the eye of the user to form the image on the retinal of the user such that the use may see an XR scene by created by the HMD 100.

The remote controller 210 may be a ring-type device that can be worn on a finger (e.g., forefinger) of the user's hand 500. The remote controller 210 may include a processor 211, a storage medium 212, and a transceiver 213. In one embodiment, the remote controller 210 may further include one or more inertial measurement units (IMUs) and/or an optical sensor 215. It is assumed that the one or more IMUs include an IMU 2141 and an IMU 2142. However, the number of the one or more IMUs is not limited thereto.

The functions or structures of the processor 211 may be similar to the processor 110. The processor 211 may be coupled to the storage medium 212, the transceiver 213, the IMU 2141, the IMU 2142, and the optical sensor 215.

The functions or structures of the storage medium 212 may be similar to the storage medium 120. The storage medium 212 may be a non-transitory computer readable storage medium configured to record a plurality of executable computer programs, modules, or applications to be loaded by the processor 211 to perform the function of the remote controller 210.

The functions or structures of the transceiver 213 may be similar to the transceiver 130. The processor 211 may communicate with other devices (e.g., HMD 100) via the transceiver 213.

The IMU 2141 (or IMU 2142) may include an accelerometer or a gyroscope. The optical sensor 215 may include a CMOS sensor or a CCD sensor.

The remote controller 220 may be a ring-type device that can be worn on a finger (e.g., middle finger) of the user's hand 500. The remote controller 220 may include a processor 221, a storage medium 222, and a transceiver 223. In one embodiment, the remote controller 220 may further include one or more IMUs and/or an optical sensor 225. It is assumed that the one or more IMUs include an IMU 2241 and an IMU 2242. However, the number of the one or more IMUs is not limited thereto.

The functions or structures of the processor 221 may be similar to the processor 211. The processor 221 may be coupled to the storage medium 222, the transceiver 223, the IMU 2241, the IMU 2242, and the optical sensor 225.

The functions or structures of the storage medium 222 may be similar to the storage medium 212. The storage medium 222 may be a non-transitory computer readable storage medium configured to record a plurality of executable computer programs, modules, or applications to be loaded by the processor 221 to perform the function of the remote controller 220.

The functions or structures of the transceiver 223 may be similar to the transceiver 213. The processor 221 may communicate with other devices (e.g., HMD 100) via the transceiver 223.

The IMU 2241 (or IMU 2242) may be an accelerometer or a gyroscope. The optical sensor 225 may include a CMOS sensor or a CCD sensor.

Figure 3:
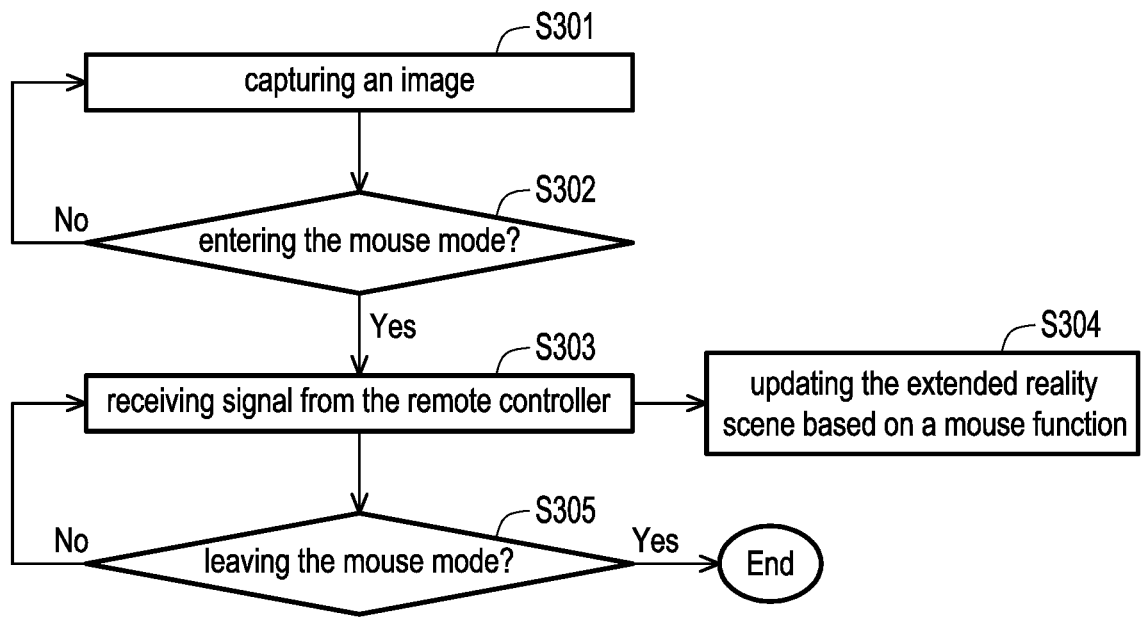
FIG. 3 illustrates a method for detecting a control mode for the XR scene according to one embodiment of the present invention.

The HMD 100 may detect a gesture of the user's hand 500 and determine whether the control mode of the HMD 100 is switched to the mouse mode according to the detection result. FIG. 3 illustrates a method for detecting a control mode for the XR scene according to one embodiment of the present invention. In step S301, the HMD 100 may capture an image including the user's hand 500 and the plane 600 through the image capture device 140.

In step S302, the HMD 100 may determine whether the HMD 100 enters the mouse mode. That is, the HMD 100 may determine whether the virtual mouse for interacting with the XR scene is enabled. If the HDM 100 has entered the mouse mode, proceeding to step S303. If the HMD has not entered the mouse mode, proceeding to step S301. When the HMD 100 enters the mouse mode, the HMD 100 may enable the virtual mouse, such that the hand 500 wearing the remote controller 210 and/or remote controller 220 may be simulated as the virtual mouse which can interact with the XR scene provided by the HMD 100.

The HMD 100 may detect the image captured by the image capture device 140 to obtain data of the hand 500 and data of the plane 600 from the image. The HMD 100 may determine whether the HMD 100 enters the mouse mode according to the data of the hand 500 and the data of the plane 600. In other words, the HMD 100 may determine whether to enable the virtual mouse or not according to the data of the hand 500 and the data of the plane 600.

Figure 4:
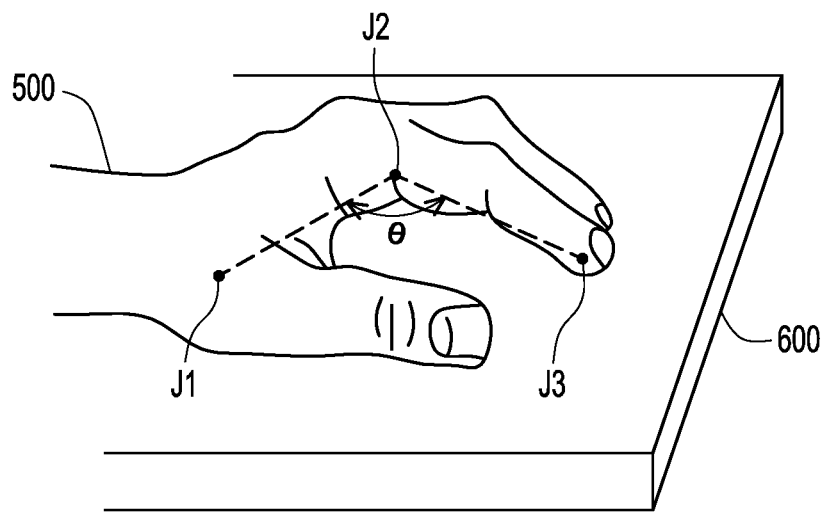
FIG. 4 illustrates a schematic diagram of a result of the hand tracking according to one embodiment of the present invention.

FIG. 4 illustrates a schematic diagram of a result of the hand tracking according to one embodiment of the present invention. The HMD 100 may perform a hand tracking algorithm on the captured image to obtain the data of the hand 500, wherein the data of the hand 500 may include a plurality of joints of the hand 500, such as joint J1, J2, and J3. In one embodiment, the joint J1, J2, and J3 may respectively represent a palm of the hand 500, a metacarpophalangeal joint (MCP) of the forefinger of the hand 500, and the distal interphalangeal joint (DIP) of the forefinger of the hand 500. The data of the hand 500 may further include positions of a joint (e.g., joint J1) of the hand 500. The HMD 100 may determine an angle formed by the plurality of joints according to the data of the hand 500 so as to detect a flexion of the hand 500. For example, the HMD 100 may determine an angle θ formed by the joints J1, J2, and J3, as shown in FIG. 4. On the other hand, the HMD 100 may perform an object detection algorithm on the captured image to obtain the data of the plane 600, wherein the data of the plane 600 may include a position of the plane 600. The HMD 100 may determine a distance between the joint J1 and the plane 600 according to the data of the hand 500 and the data of the plane 600. The HMD 100 may determine that the HMD 100 has entered the mouse mode according to the angle θ and/or the distance between the joint J1 and the plane 600.

In one embodiment, the HMD 100 may determine that the HMD 100 has entered the mouse mode if the angle θ is less than or equal to an angle threshold and/or the distance between the joint J1 and the plane 600 is less than or equal to a distance threshold, and determine that the HMD 100 has not entered the mouse mode if the angle θ is greater than the angle threshold and/or the distance between the joint J1 and the plane 600 is greater than the distance threshold.

For example, the angle threshold may be set to 160 degree. When the hand 500 is relaxed, the angle θ may be closed to 180 degree. Since the angle θ is greater than the angle threshold, the HMD 100 may determine that no flexion of the hand 500 is detected. Accordingly, the HMD 100 may determine that the HMD 100 has not entered the mouse mode. The HMD 100 may determine that the control mode of HMD 100 is switched to the keyboard mode, wherein the user may interact with the XR scene through a keyboard command received by the transceiver 130. On the other hand, when the hand 500 is bent, the angel θ may become less than the angle threshold (e.g., angel θ=150 degree), and the HMD 100 may determine that a flexion of the hand 500 is detected. Accordingly, the HMD 100 may determine that the HMD 100 has entered the mouse mode. For example, the distance threshold may be set to 2 cm. When the hand 500 is put on the table, the distance between the joint J1 and the plane 600 may become less than or equal to the distance threshold. Accordingly, the HMD 100 may determine that the HMD 100 has entered the mouse mode.

Referring to FIG. 3, after determining that the HMD 100 has entered the mouse mode, in step S303, the HMD 100 may receive signals from the remote controller 210 and/or 220. In step S304, the HMD 100 may update the XR scene provided by the HMD 100 according to the signals from the remote controller 210 and/or 220 based on a mouse function of the enabled virtual mouse. The mouse function of the virtual mouse may include a move operation, a click operation (e.g., a single-click operation or a double-click operation), or a scroll operation (e.g., a scroll up operation or a scroll down operation).

In step S305, the HMD 100 may determine whether the HMD 100 leaves the mouse mode. That is, the HMD 100 may determine whether to disable the virtual mouse. If the HMD 100 has leaved the mouse mode, ending the procedure. If the HMD 100 has not leaved the mouse mode, proceeding to step S303.

The HMD 100 may determine that the HMD 100 has leaved the mouse mode according to the angle θ and/or the distance between the joint J1 and the plane 600. In one embodiment, the HMD 100 may determine that the HMD 100 has leaved the mouse mode if the angle θ is greater than an angle threshold and/or the distance between the joint J1 and the plane 600 is greater than a distance threshold, and determine that the HMD 100 has not leaved the mouse mode if the angle θ is less than or equal to the angle threshold and/or the distance between the joint J1 and the plane 600 is less than or equal to the distance threshold.

In step S305, the HMD 100 may switch the control mode from the mouse mode to another control mode (e.g., the keyboard mode). That is, the HMD 100 may disable the virtual mouse for interacting with the XR scene.

Figure 5:
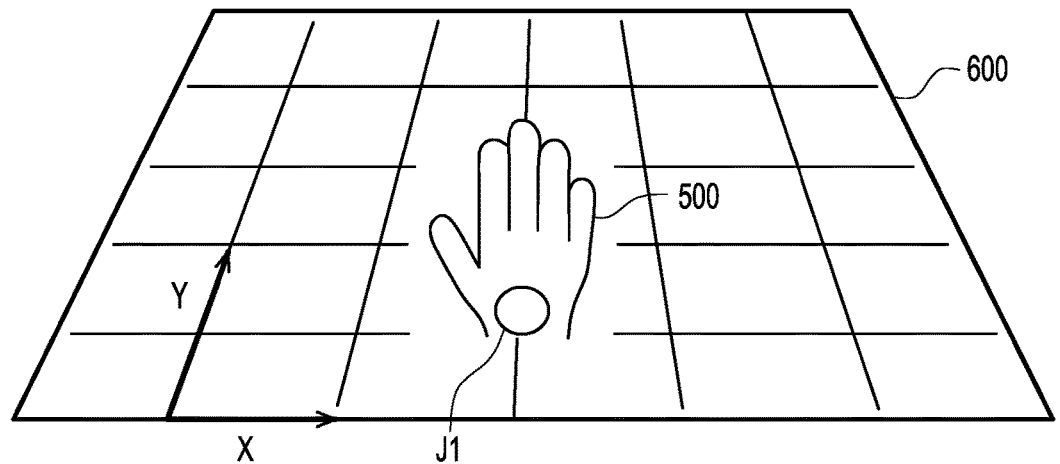
FIG. 5 illustrates a schematic diagram of performing a move operation of the virtual mouse by using hand tracking according to one embodiment of the present invention.

When the virtual mouse is enabled, the HMD 100 may move a cursor corresponding to the virtual mouse according to a hand tracking result for the hand 500. FIG. 5 illustrates a schematic diagram of performing a move operation of the virtual mouse by using hand tracking according to one embodiment of the present invention. The HMD 100 may perform hand tracking algorithm on the image captured by the image capture device 140 to obtain the data of the hand 500, wherein the data of the hand 500 may include positions of a joint J1 and time information corresponding to the positions, wherein the joint J1 may represent a palm of the hand 500. The accelerate or speed of the moving hand 500 may be derived by the HDM 100 according to the position of the joint and the time information. When the hand 500 put on the plane 600 is moving, the position of the hand 500 may change. Accordingly, the HMD 100 may move the cursor corresponding to the virtual mouse in the XR scene according to the position (or accelerate or speed) of the hand 500.

Figure 6:
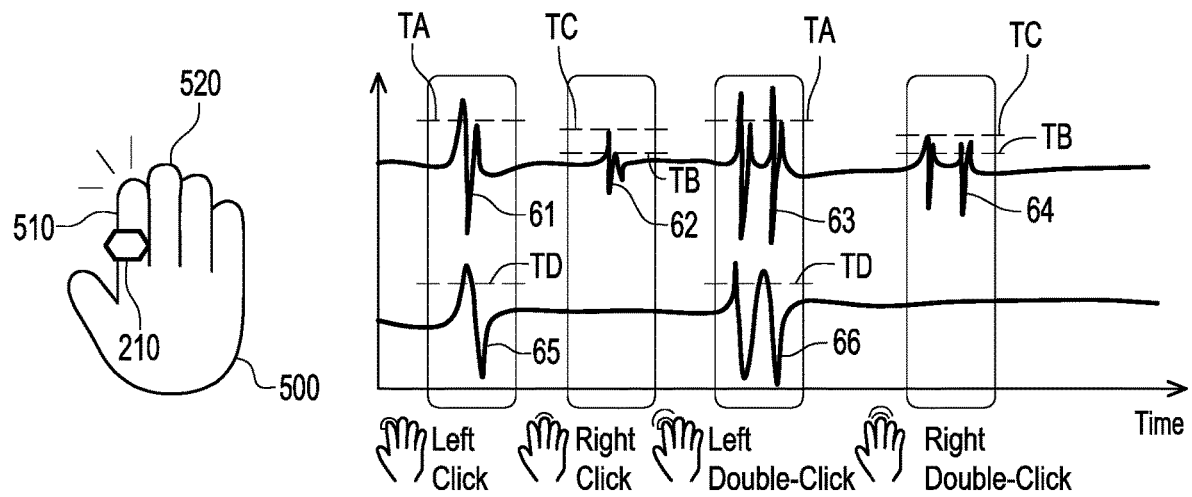
FIG. 6 illustrates a schematic diagram of performing a click operation by using one remote controller according to one embodiment of the present invention.

FIG. 6 illustrates a schematic diagram of performing a click operation by using one remote controller according to one embodiment of the present invention. When the virtual mouse is enabled, the user may perform a click operation in the XR scene by using one remote controller. It is assumed that the remote controller 210 is worn on the finger 510 (e.g., forefinger) of the hand 500 and no remote controller is worn on the finger 520 (e.g., middle finger) of the hand 500. If the finger 510 makes a click action, the HMD 100 may receive signals from the IMU 2141 and/or IMU 2142, and the HMD 100 may perform a click operation by the virtual mouse in the XR scene according to the received signals.

In one embodiment, the HMD 100 may perform a click operation associated with the finger 510 (i.e., a left click) wearing the remote controller 210 according to a signal measured by the IMU 2141, wherein the IMU 2141 may be an accelerometer or a gyroscope. For example, after the HMD 100 receiving signal 61 measured by the IMU 2141, the HMD 100 may detect the amplitude of the signal 61. The HMD 100 may perform the click operation associated with the finger 510 if the amplitude of the signal 61 is greater than a threshold TA. Otherwise, the HMD 100 may not perform the click operation associated with the finger 510.

In one embodiment, the HMD 100 may perform a click operation associated with the finger 520 (i.e., a right click)

not wearing the remote controller 210 according to a signal measured by the IMU 2141, wherein the IMU 2141 may be an accelerometer (gyroscope may not detect any signal if the finger 510 wearing the remote controller 210 is not moving). For example, after the HMD 100 receiving signal 62 measured by the IMU 2141, the HMD 100 may detect the amplitude of the signal 62. The HMD 100 may perform the click operation associated with the finger 520 if the amplitude of the signal 62 is greater than a threshold TB but less than or equal to a threshold TC, wherein the threshold TB may be less than the threshold TC, and the threshold TC may be less than the threshold TA. Otherwise, the HMD 100 may not perform the click operation associated with the finger 520.

In one embodiment, the HMD 100 may perform a single-click operation or a double-click according to the number of the extreme values (e.g., wave peaks or wave valleys) of the signal measured by the IMU 2141. For example, the HMD 100 may perform a single-click operation associated with the finger 510 according to the signal 61 in response to the number of the extreme values of the signal 61 being equal to one. Otherwise, the HMD 100 may not perform the single-click operation associated with the finger 510. For another example, the HMD 100 may perform a single-click operation associated with the finger 520 according to the signal 62 in response to the number of the extreme values of the signal 62 being equal to one. Otherwise, the HMD 100 may not perform the single-click operation associated with the finger 520. For another example, the HMD 100 may perform a double-click operation associated with the finger 510 according to the signal 63 in response to the number of the extreme values of the signal 63 being equal to two. Otherwise, the HMD 100 may not perform the double-click operation associated with the finger 510. For another example, the HMD 100 may perform a double-click operation associated with the finger 520 according to the signal 64 in response to the number of the extreme values of the signal 64 being equal to two. Otherwise, the HMD 100 may not perform the double-click operation associated with the finger 520.

In one embodiment, the HMD 100 may perform a click operation associated with the finger 510 according to signals measured by the IMU 2141 and IMU 2142 respectively, wherein the IMU 2141 or IMU 2142 may be an accelerometer or a gyroscope. For example, after the HMD 100 receiving signal 61 measured by the IMU 2141 and signal 65 measured by the IMU 2142, the HMD 100 may detect the amplitude of the signal 61 and the amplitude of the signal 65. The HMD 100 may perform a single-click operation if the amplitude of the signal 61 is greater than a threshold TA and the amplitude of the signal 65 is greater than a threshold TD. Otherwise, the HMD 100 may not perform the single-click operation. For another example, after the HMD 100 receiving signal 63 measured by the IMU 2141 and signal 66 measured by the IMU 2142, the HMD 100 may detect the amplitude of the signal 63 and the amplitude of the signal 66. The HMD 100 may perform a double-click operation if the amplitude of the signal 63 is greater than a threshold TA and the amplitude of the signal 66 is greater than a threshold TD. Otherwise, the HMD 100 may not perform the double-click operation.

In one embodiment, the HMD 100 may pre-store a machine learning (ML) model in the storage medium 120. The HMD 100 may input the signal measured by the IMU 2141 and/or the signal measured by the IMU 2142 into the ML model to recognize a mouse operation (e.g., a click operation or a scroll operation) of the virtual mouse. The HMD 100 may update the XR scene according to the recognized mouse operation.

Figure 7:
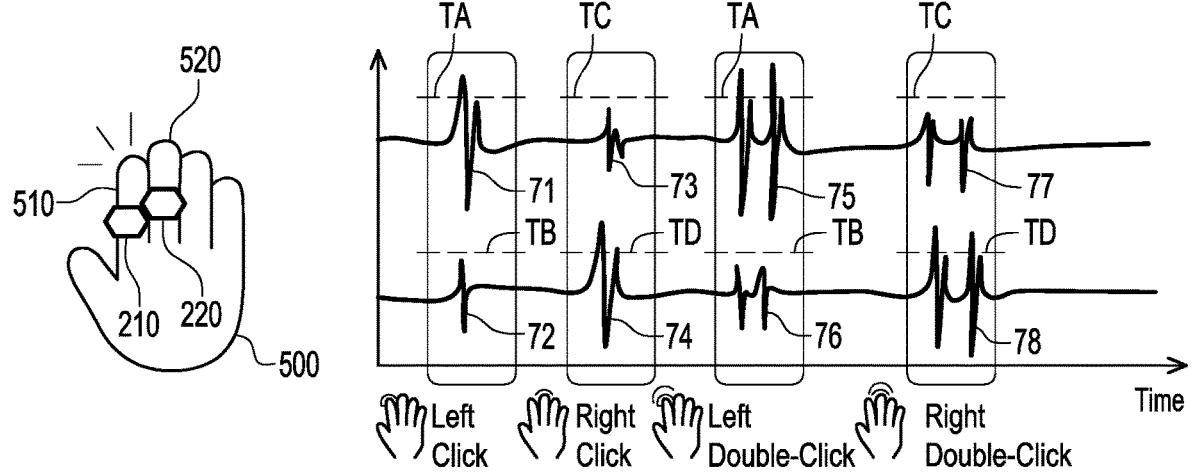
FIG. 7 illustrates a schematic diagram of performing a click operation by using multiple remote controllers according to one embodiment of the present invention.

FIG. 7 illustrates a schematic diagram of performing a click operation by using multiple remote controllers according to one embodiment of the present invention. When the virtual mouse is enabled, the user may perform a click operation in the XR scene by using multiple remote controllers. It is assumed that the remote controller 210 is worn on the finger 510 (e.g., forefinger) of the hand 500 and the remote controller 220 is worn on the finger 520 (e.g., middle finger) of the hand 500. If the finger 510 or finger 520 makes a click action, the HMD 100 may receive signals from the remote controller 210 (i.e., signals measured by IMU 2141 and/or IMU 2142) and signals from the remote controller 220 (i.e., signals measured by IMU 2241 and/or IMU 2242). The HMD 100 may perform a click operation of the virtual mouse in the XR scene according to the received signals.

In one embodiment, the HMD 100 may perform a click operation associated with the finger 510 (i.e., a left click). For example, after the HMD 100 receiving signal 71 measured by the remote controller 210 and signal 72 measured by the remote controller 220, the HMD 100 may detect the amplitudes of the signal 71 and signal 72. The HMD 100 may perform the click operation associated with the finger 510 if the amplitude of the signal 71 is greater than a threshold TA and the amplitude of the signal 72 is less than or equal to a threshold TB. Otherwise, the HMD 100 may not perform the click operation associated with the finger 510.

In one embodiment, the HMD 100 may perform a click operation associated with the finger 520 (i.e., a right click). For example, after the HMD 100 receiving signal 73 measured by the remote controller 210 and signal 74 measured by the remote controller 220, the HMD 100 may detect the amplitudes of the signal 73 and signal 74. The HMD 100 may perform the click operation associated with the finger 520 if the amplitude of the signal 73 is less than or equal to a threshold TC and the amplitude of the signal 74 is greater than a threshold TD, wherein the threshold TC and the threshold TD may be less than or equal to the threshold TA and the threshold TB respectively. Otherwise, the HMD 100 may not perform the click operation associated with the finger 520.

In one embodiment, the HMD 100 may perform a single-click operation or a double-click operation according to the number of the extreme values of the signal measured by the remote controller 210 and the number of the extreme values of the signal measured by the remote controller 220. For example, the HMD 100 may perform a single-click operation associated with the finger 510 in response to the number of the extreme values of the signal 71 being equal to one and the number of the extreme values of the signal 72 being equal to one. Otherwise, the HMD 100 may not perform the single-click operation associated with the finger 510. For another example, the HMD 100 may perform a single-click operation associated with the finger 520 in response to the number of the extreme values of the signal 73 being equal to one and the number of the extreme values of the signal 74 being equal to one. Otherwise, the HMD 100 may not perform the single-click operation associated with the finger 520. For another example, the HMD 100 may perform a double-click operation associated with the finger 510 in response to the number of the extreme values of the signal 75 being equal to two and the number of the extreme values of the signal 76 being equal to two. Otherwise, the HMD 100 may not perform the double-click operation associated with the finger 510. For another example, the HMD 100 may perform a double-click operation associated with the finger 520 in response to the number of the extreme values of the signal 77 being equal to two and the number of the extreme values of the signal 78 being equal to two. Otherwise, the HMD 100 may not perform the double-click operation associated with the finger 520.

In one embodiment, the HMD 100 may pre-store a ML model in the storage medium 120. The HMD 100 may input the signal measured by the remote controller 210 and/or the signal measured by the remote controller 220 into the ML model to recognize a mouse operation (e.g., a click operation or a scroll operation) of the virtual mouse. The HMD 100 may update the XR scene according to the recognized mouse operation.

Figure 8:
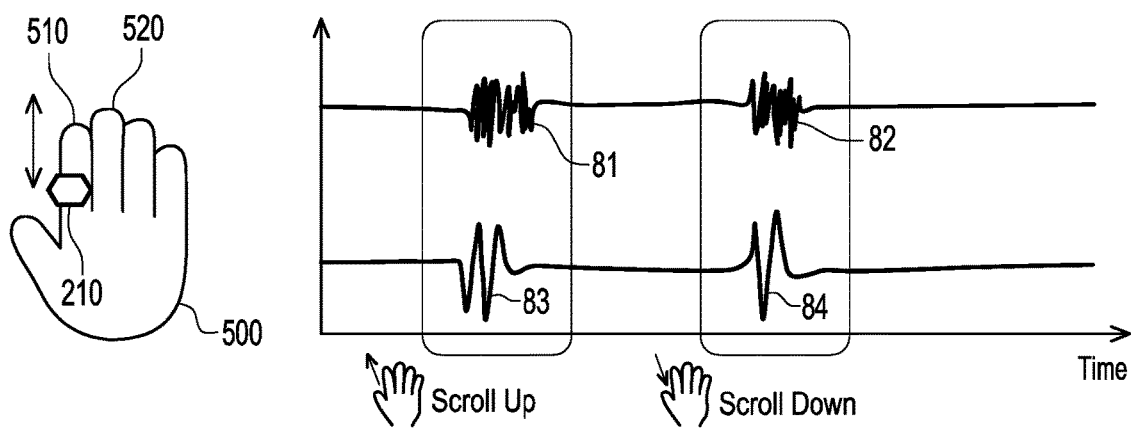
FIG. 8 illustrates a schematic diagram of performing a scroll operation by using a remote controller according to one embodiment of the present invention.

FIG. 8 illustrates a schematic diagram of performing a scroll operation by using a remote controller according to one embodiment of the present invention. When the virtual mouse is enabled, the user may perform a scroll operation in the XR scene by using a remote controller. It is assumed that the remote controller 210 is worn on the finger 510 of the hand 500. If the finger 510 makes a scroll action, the HMD 100 may receive signals from the IMU 2141 and/or IMU 2142, and the HMD 100 may perform a scroll operation of the virtual mouse in the XR scene according to the received signals.

In one embodiment, the HMD 100 may detect a wave peak and a wave valley of the signal measured by the IMU 2141. If a time point of the occurring of the wave peak (e.g., the first wave peak of the signal) is later than a time point of the occurring of the wave valley (e.g., the first wave valley of the signal), the HMD 100 may perform a first scroll operation of the virtual mouse in the XR scene. If the time point of the occurring of the wave peak is earlier than the time point of the occurring of the wave valley, the HMD 100 may perform a second scroll operation of the virtual mouse in the XR scene, wherein the second scroll operation is different from the first scroll operation. For example, the HMD 100 may perform a scroll up operation in the XR scene in response to the time point of the wave peak of the signal 81 being later than the time point of the wave valley of the signal 81. Otherwise, the HMD 100 may not perform the scroll up operation. For another example, the HMD 100 may perform a scroll down operation in the XR scene in response to the time point of the wave peak of the signal 82 being earlier than the time point of the wave valley of the signal 82. Otherwise, the HMD 100 may not perform the scroll down operation.

In one embodiment, the HMD 100 may detect wave peaks and wave valleys of the signals measured by the IMU 2141 and IMU 2142. If a time point of the occurring of the wave peak (e.g., the first wave peak of the signal) of the signal measured by the IMU 2141 is later than a time point of the occurring of the wave valley (e.g., the first wave valley of the signal) of the signal measured by the IMU 2141, and a time point of the occurring of the wave peak (e.g., the first wave peak of the signal) of the signal measured by the IMU 2142 is later than a time point of the occurring of the wave valley (e.g., the first wave valley of the signal) of the signal measured by the IMU 2142, the HMD 100 may perform a first scroll operation of the moues function in the XR scene. If a time point of the occurring of the wave peak (e.g., the first wave peak of the signal) of the signal measured by the IMU 2141 is earlier than a time point of the occurring of the wave valley (e.g., the first wave valley of the signal) of the signal measured by the IMU 2141, and a time point of the occurring of the wave peak (e.g., the first wave peak of the signal) of the signal measured by the IMU 2142 is earlier than a time point of the occurring of the wave valley (e.g., the first wave valley of the signal) of the signal measured by the IMU 2142, the HMD 100 may perform a second scroll operation of the moues function in the XR scene, wherein the second scroll operation is different from the first scroll operation.

For example, the HMD 100 may perform a scroll up operation in the XR scene in response to the time point of the wave peak of the signal 81 being later than the time point of the wave valley of the signal 81 and the time point of the wave peak of the signal 82 being later than the time point of the wave valley of the signal 82. Otherwise, the HMD 100 may not perform the scroll up operation. For another example, the HMD 100 may perform a scroll down operation in the XR scene in response to the time point of the wave peak of the signal 83 being earlier than the time point of the wave valley of the signal 83 and the time point of the wave peak of the signal 84 being earlier than the time point of the wave valley of the signal 84. Otherwise, the HMD 100 may not perform the scroll down operation.

Figure 9:
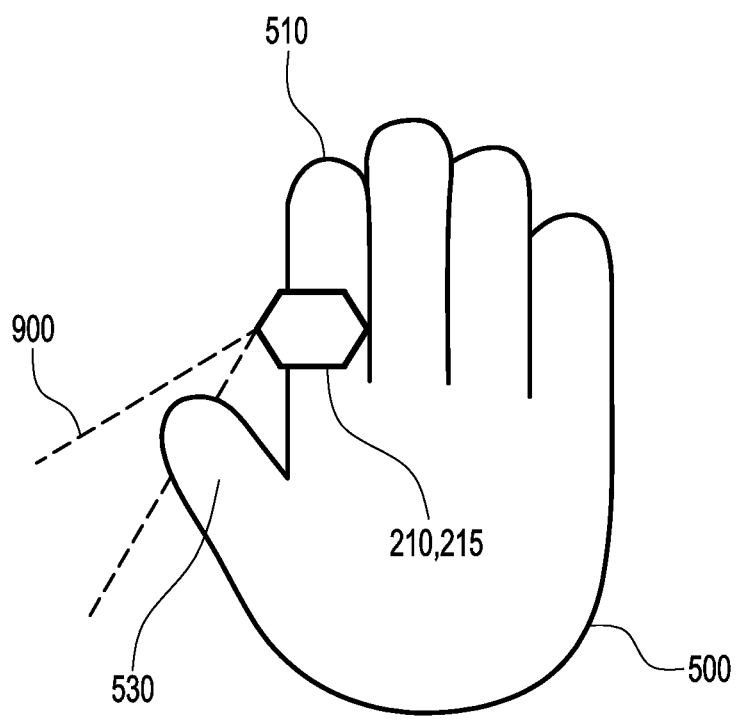
FIG. 9 illustrates a schematic diagram of a remote controller with an optical sensor according to one embodiment of the present invention.

FIG. 9 illustrates a schematic diagram of a remote controller 210 with an optical sensor 215 according to one embodiment of the present invention. It is assumed that the remote controller 210 is worn on finger 510 (e.g., forefinger) of the hand 500. The optical sensor 215 may have a detection area 900 directed to finger 530 (e.g., thumb) of the hand 500, and the optical sensor 215 may generate a signal according to the detection area 900. The remote controller 210 may transmit the signal generated by the optical sensor 215 to the HMD 100.

In one embodiment, the HMD 100 may determine whether an object (e.g., finger 530) has moved toward the optical sensor 215 according to the signal generated by the optical sensor 215. For example, if the optical sensor 215 has been touched or clicked by the finger 530, the HMD 100 may determine that an object has moved toward the optical sensor 215 according to the signal. Accordingly, the HMD 100 may perform a click operation of the virtual mouse in the XR scene. Otherwise, the HMD 100 may not perform the click operation of the virtual mouse in the XR scene.

In one embodiment, the HMD 100 may determine whether an object (e.g., finger 530) has moved across the detection area 900 according to the signal generated by the optical sensor 215. If the object has moved across the detection area 900 in a specific direction, the HMD 100 may perform a scroll operation of the virtual mouse in the XR scene according to the specific direction. Specifically, the HMD 100 may perform a first scroll operation of the virtual mouse in the XR scene in response to the object having moved across the detection area 900 in a first direction, and the HMD 100 may perform a second scroll operation of the virtual mouse in the XR scene in response to the object having moved across the detection area 900 in a second direction opposite to the first direction, wherein the first scroll operation (e.g., a scroll up operation) is different from the second scroll operation (e.g., a scroll down operation).

In one embodiment, the HMD 100 may pre-store a ML model in the storage medium 120. The HMD 100 may input the signal measured by the optical sensor 215 and/or signal measured by the optical sensor 225 into the ML model to recognize a mouse operation (e.g., a click operation or a scroll operation) of the virtual mouse. The HMD 100 may update the XR scene according to the recognized mouse operation.

Figure 10:
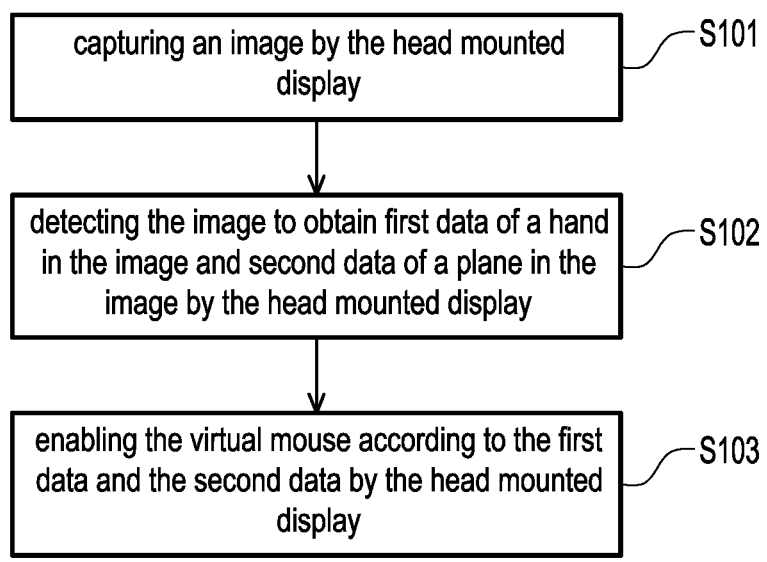
FIG. 10 illustrates a flowchart of a method for remotely controlling extended reality by a virtual mouse according to one embodiment of the present invention.

FIG. 10 illustrates a flowchart of a method for remotely controlling extended reality by a virtual mouse according to one embodiment of the present invention, wherein the method may be implemented by the system 10 as shown in FIG. 2. In step S101, capturing an image by the head mounted display. In step S102, detecting the image to obtain first data of a hand in the image and second data of a plane in the image by the head mounted display. In step S103, enabling the virtual mouse according to the first data and the second data by the head mounted display.

In summary, the HMD of the present invention may detect the gesture of the user to determine whether the user want to enable a virtual mouse function for interacting with the XR scene. If the HMD detects a flexion of the user's hand, the HMD may determine that the user wants to enable the virtual mouse function. After the virtual mouse function being enabled, the user's hand wearing one or more ring-type remote controllers can be simulated as a mouse. The HMD may receive the signal transmitted from the remote controller and determine whether a click operation or a scroll operation corresponding to the virtual mouse are performing by the user, and thus the HMD may interact with the XR scene according to the signal. Accordingly, the present invention provides a convenient and intuitive way for the user of an HMD to interact with the XR environment.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system for remotely controlling extended reality by a virtual mouse, comprising:
    a head mounted display, comprising an image capture device; and
    a first remote controller for being worn on a hand, wherein the first remote controller communicatively connects to the head mounted display and comprises a first inertial measurement unit, wherein the head mounted display is configured to:
    capture an image through the image capture device;
    detect the image to obtain first data of the hand in the image and second data of a plane in the image;
    enable the virtual mouse according to the first data and the second data;
    receive a first signal generated by the first inertial measurement unit;
    detect a wave peak and a wave valley of the first signal; and
    in response to a first time point of the wave peak being later than a second time point of the wave valley, perform a first scroll operation by the virtual mouse in an extended reality scene.

2. The system of claim 1, wherein the first data comprises a first joint of the hand, and the head mounted display is further configured to:
    determine whether a distance between the first joint and the plane is less than or equal to a distance threshold according to the first data and the second data; and
    in response to the distance being less than or equal to the distance threshold, enable the virtual mouse.

3. The system of claim 2, wherein the first data comprises a plurality of joints of the hand including the first joint, and the head mounted display is further configured to:
    determine whether an angle formed by the plurality of joints is less than or equal to an angle threshold; and
    in response to the angle being less than or equal the angle threshold, enable the virtual mouse.

4. The system of claim 3, wherein the head mounted display is further configured to:
    identify the plurality of joints by performing a hand tracking algorithm on the image to obtain the first data, wherein the first joint in the plurality of joints represents a palm of the hand.

5. The system of claim 1, wherein the head mounted display is further configured to:
    obtain a position of a palm of the hand by performing a hand tracking algorithm on the image; and
    move a cursor corresponding to the virtual mouse in the extended reality scene according to the position.

6. The system of claim 1, wherein the head mounted display is further configured to:
    perform a click operation by the virtual mouse in the extended reality scene according to the first signal.

7. The system of claim 6, wherein the head mounted display is further configured to:
    detect a number of at least one local extreme value of the first signal; and
    determine the click operation is one of a single-click operation and a double-click operation according to the number.

8. The system of claim 6, wherein the head mounted display is further configured to:
    detect an amplitude of the first signal; and
    in response to the amplitude being greater than a first threshold, perform the click operation associated with a first finger of the hand wearing the first remote controller.

9. The system of claim 8, wherein the head mounted display is further configured to:
    in response to the amplitude being greater than a second threshold but less than or equal to a third threshold, perform the click operation associated with a second finger of the hand not wearing the first remote controller, wherein the third threshold is less than the first threshold.

10. The system of claim 6, wherein the first remote controller further comprising:
    a second inertial measurement unit, wherein the head mounted display is further configured to:
    receive a second signal generated by the second inertial measurement unit; and
    perform the click operation according to the first signal and the second signal.

11. The system of claim 10, wherein the head mounted display is further configured to:
    detect a first amplitude of the first signal and a second amplitude of the second signal; and
    in response to the first amplitude being greater than a first threshold and the second amplitude being greater than a second threshold, perform the click operation associated with a first finger of the hand wearing the first remote controller.

12. The system of claim 6, wherein the first remote controller is for being worn on a first finger of the hand, and the system further comprising:
    a second remote controller for being worn on a second finger of the hand, wherein the second remote controller comprises a second inertial measurement unit and communicatively connects to the head mounted display, wherein the head mounted display is further configured to:

receive a second signal generated by the second inertial measurement unit; and perform the click operation according to the first signal and the second signal.

13. The system of claim 12, wherein the head mounted display is further configured to:

detect a first amplitude of the first signal and a second amplitude of the second signal;

in response to the first amplitude being greater than a first threshold and the second amplitude being less than or equal to a second threshold, perform the click operation associated with the first finger; and in response to the first amplitude being less than or equal to a third threshold and the second amplitude being greater than a fourth threshold, perform the click operation associated with the second finger, wherein the third threshold and the second threshold are less than or equal to the first threshold and fourth threshold respectively.

14. The system of claim 6, wherein the head mounted display is further configured to:

in response to the first time point of the wave peak being earlier than the second time point of the wave valley, perform a second scroll operation by the virtual mouse in the extended reality scene.

15. The system of claim 6, wherein the first inertial measurement unit comprise at least one of an accelerometer and a gyroscope.

16. The system of claim 1, wherein the first remote controller is for being worn on a first finger of the hand, and the first remote controller comprising:

an optical sensor with a detection area directed to a second finger of the hand, wherein the optical sensor generates a second signal according to the detection area.

17. The system of claim 16, wherein the head mounted display is further configured to:

determine whether an object has moved toward the optical sensor according to the second signal; and in response to determining the object has moved toward the optical sensor, perform a click operation by the virtual mouse in the extended reality scene.

18. The system of claim 16, wherein the head mounted display is further configured to:

determine whether an object has moved across the detection area according to the second signal; and in response to determining the object has moved across the detection area, perform a scroll operation by the virtual mouse in the extended reality scene.

19. The system of claim 18, wherein the head mounted display is further configured to:

determine if the object has moved across the detection area in a first direction or a second direction opposite to the first direction;

in response to determining the object has moved in the first direction, determine the scroll operation is a second scroll operation; and in response to determining the object has moved in the second direction, determine the scroll operation is a third scroll operation.

20. A method for remotely controlling extended reality by a virtual mouse, suitable for a system comprising a head mounted display and a first remote controller for being worn on a hand, wherein the head mounted display comprises a first inertial measurement unit, wherein the method comprising:

capturing an image by the head mounted display;

detecting the image to obtain first data of the hand in the image and second data of a plane in the image by the head mounted display;

enabling the virtual mouse according to the first data and the second data by the head mounted display receiving a first signal generated by the first inertial measurement unit by the head mounted display;

detecting a wave peak and a wave valley of the first signal by the head mounted display; and in response to a first time point of the wave peak being later than a second time point of the wave valley, performing a first scroll operation by the virtual mouse in an extended reality scene.

* * * * *